(12) United States Patent
Shimazaki

(10) Patent No.: US 6,938,850 B2
(45) Date of Patent: *Sep. 6, 2005

(54) STORING METHOD AND STORING APPARATUS FOR ELONGATED PLASTIC DEFORMATION MEMBER

(75) Inventor: Nobuyoshi Shimazaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/483,238

(22) PCT Filed: Jul. 11, 2002

(86) PCT No.: PCT/JP02/07040

§ 371 (c)(1),
(2), (4) Date: Aug. 10, 2004

(87) PCT Pub. No.: WO03/006350

PCT Pub. Date: Jan. 23, 2003

(65) Prior Publication Data

US 2004/0262445 A1 Dec. 30, 2004

(30) Foreign Application Priority Data

Jul. 11, 2001 (JP) ........................................ 2001-210676

(51) Int. Cl.$^7$ ............................................. B65H 75/18
(52) U.S. Cl. .................... 242/602; 242/533.3; 242/540; 242/559.4; 156/405.1
(58) Field of Search ................................ 242/602, 528, 242/393, 540, 595.1, 533.3, 559.4; 156/405.1, 406.4

(56) References Cited

U.S. PATENT DOCUMENTS

| | | | | |
|---|---|---|---|---|
| 3,674,222 A | * | 7/1972 | Smiley | 242/602 |
| 4,705,227 A | * | 11/1987 | Honegger | 242/528 |
| 4,741,487 A | * | 5/1988 | Balass | 242/528 |
| 4,757,952 A | * | 7/1988 | Balzer | 242/528 |
| 4,934,620 A | * | 6/1990 | Rossi | 242/528 |

(Continued)

FOREIGN PATENT DOCUMENTS

| | | |
|---|---|---|
| EP | 0 344 019 A2 | 11/1989 |
| EP | 0 567 147 A1 | 10/1993 |
| JP | 61-037647 A | 2/1986 |
| JP | 63-031962 A | 2/1988 |
| JP | 02-310239 A | 12/1990 |
| JP | 10-305473 A | 11/1998 |
| JP | 11-301892 A | 11/1999 |

OTHER PUBLICATIONS

European Search Report.

*Primary Examiner*—William A. Rivera
(74) *Attorney, Agent, or Firm*—Sughrue Mion, PLLC

(57) ABSTRACT

To obtain a storing method for an elongated plastic deformation member in which the elongated plastic deformation member and a liner are overlapped and wound around a reel for storing the elongated plastic deformation member, whereby partial deformation or deformation nonuniformity of the elongated plastic deformation member can be suppressed.

In the present invention, when a liner and an unvulcanized tread member are wound on a reel 72 and stored, the reel 72 is supported by a driven roll 40 and a driving roll 30. The reel 72 is intermittently rotated by alternately repeating normal rotation and inverse rotation, and rotational angles of the reel 72 are caused to be different before and after rotation of the reel 72 is stopped, whereby, during storing, a load due to the tread member itself can be imparted more uniformly to the entire circumference of the wound tread member. Accordingly, collapsing deformation of the tread member due to the load becomes uniform in a longitudinal direction of the wound tread member. Consequently, difference in the shape of the tread member does not occur throughout the circumference of the wound tread member.

9 Claims, 15 Drawing Sheets

U.S. PATENT DOCUMENTS

| | | | | |
|---|---|---|---|---|
| 5,116,043 A | * | 5/1992 | Jermann et al. | 242/528 |
| 5,176,333 A | * | 1/1993 | Stauber | 242/528 |
| 5,364,490 A | * | 11/1994 | Hilke et al. | 156/405.1 |
| 5,673,869 A | * | 10/1997 | Honegger | 242/528 |
| 5,762,740 A | * | 6/1998 | Benzing et al. | 156/406.4 |
| 6,126,780 A | * | 10/2000 | Benzing et al. | 156/406.4 |
| 6,412,730 B1 | * | 7/2002 | Shimazaki | 242/602 |

* cited by examiner

F I G. 1
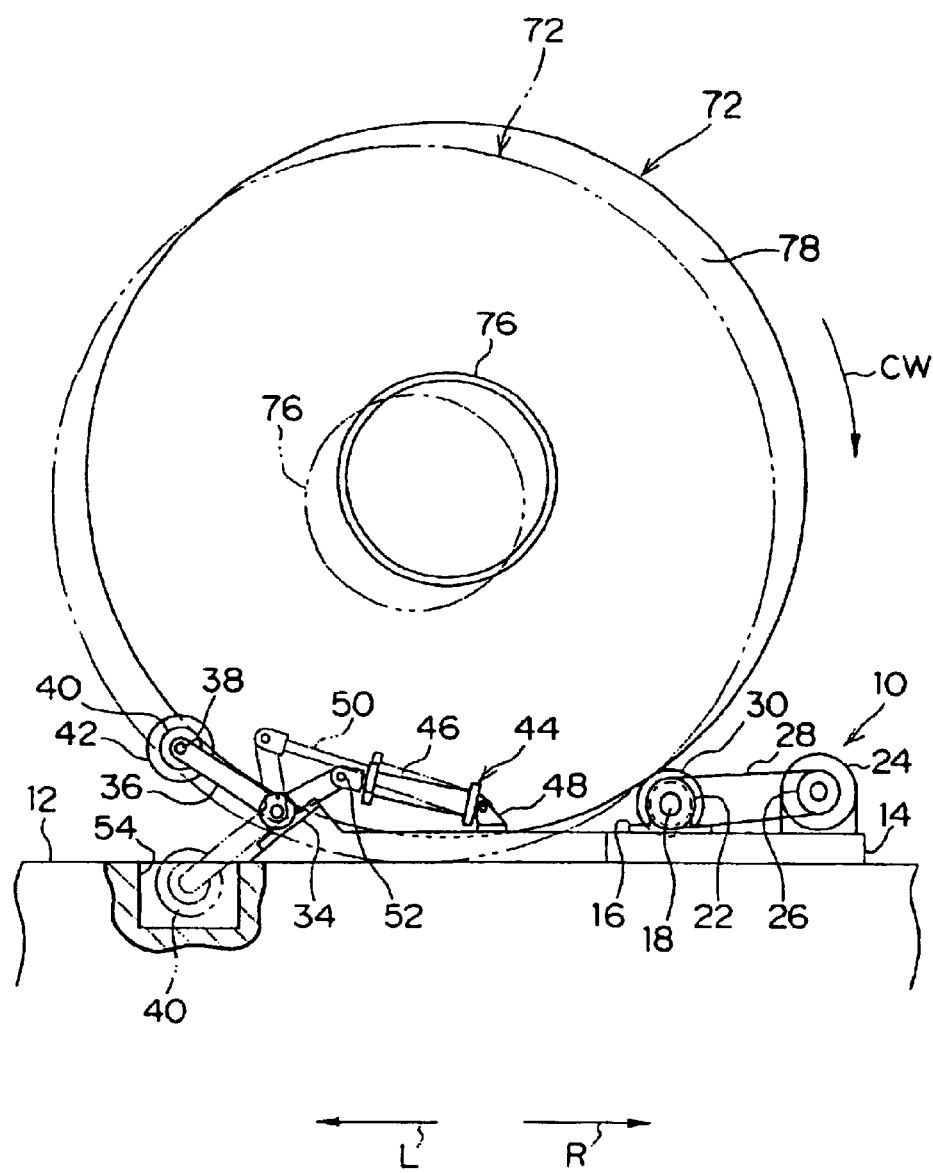

STORING METHOD AND STORING APPARATUS FOR ELONGATED PLASTIC DEFORMATION MEMBER

TECHNICAL FIELD

The present invention relates to a storing method and a storing apparatus for an elongated plastic deformation member in which a liner and the elongated plastic deformation member are overlapped and wound around a take-up reel.

BACKGROUND TECHNOLOGY

Conventionally, in order to store unvulcanized raw rubber such as a tire tread or side walls, a method is known in which an elongated raw rubber member, which has a fixed cross-sectional configuration and which is extruded from an extruder, is wound and stored.

At this time, since raw rubber has a viscosity, if it is wound as it is, an outside portion and an inside portion of the wound raw rubber are adhered to each other.

For this reason, a method is generally known in which the raw rubber member extruded from the extruder is wound through a liner, and the liner is interposed between respective layers of the wound raw rubber member, thus preventing adhesion of the raw rubber to itself.

In general, unvulcanized raw rubber has plasticity, and tends to deform upon receipt of mechanical stress. When unvulcanized raw rubber is wound together with a liner, raw rubber is deformed due to tension of the liner and due to the raw rubber's own weight.

Raw rubber deforms largely due to its own weight particularly when it is overlapped in a step form. This hinders in a later building processing and noticeably deteriorates uniformity performance of a product (nonuniformity).

Therefore, as shown in FIG. 15, a storing apparatus for an elongated member has been proposed in which spacers 102 are attached to both ends of a liner 103 to be integrated with each other. A raw rubber member 101 is wound around a reel and the liner 103 is interposed between layers of the wound raw rubber member 101. A spacing d is formed between an outside portion of the raw rubber member 101 and an inside portion of the liner 103. Accordingly, deformation of the raw rubber member 101 can be prevented.

As shown in FIG. 16, a storing apparatus for an elongated member is proposed in which receiving members 204 and 205 are respectively disposed at mutually facing sides of a pair of mutually facing rotational members 202 and 203 facing each other, along spirals which are separated from each other at a regular interval k around a central axis C of a reel. An elongated member 201 is wound, through a liner 206, by the receiving members 204 and 205 of the reel. A spacing d is formed between an outside portion of the wound elongated member 201 and an inside portion of the liner 206. Accordingly, plastic deformation of a raw rubber product can be prevented.

In the apparatus in which the spacers 102 are integrated with both ends of the liner 103 (see FIG. 15) or in the apparatus having a pair of the receiving members 204 and 205 disposed along spirals that are separated from each other at a regular interval (see FIG. 16), a spacing d can be formed between an outside portion of the wound elongated product and an inside portion of the liner, whereby occurrence of plastic deformation of a raw rubber product can be prevented.

Since there are many raw rubber products which have different thickness, in the above-described storing apparatuses shown in FIGS. 15 and 16, a spacing d between spirals is determined on the basis of the thickest raw rubber product.

Therefore, in a case in which a thinner raw rubber member is wound, a spacing d becomes larger, a winding length of the raw rubber member becomes shorter, and winding efficiency is deteriorated.

In order to solve this problem, attempts to prepare a plurality of the liners 103 in which the spacers 102 have different thickness or a plurality of apparatuses each having a different spacing d between spirals have caused drawbacks in that a manufacturing cost of the apparatus becomes higher and efficiency in use also deteriorates.

In view of the aforementioned facts, an object of the present invention is to provide a storing method and a storing apparatus for an elongated plastic deformation member such as raw rubber, in which partial deformation or deformation nonuniformity of the elongated plastic deformation member can be suppressed during storing of the elongated plastic deformation member which is wound into layers.

DISCLOSURE OF THE INVENTION

In order to accomplish the aforementioned objects, an embodiment of the invention is a storing method for an elongated plastic deformation member in which a thin-plated liner and the elongated plastic deformation member are overlapped and wound around an outer circumferential surface of a take-up feel, and the take-up reel is set on a mounting surface such that the axis of the take-up reel and the mounting surface are substantially parallel to each other, characterized in that, during storing of the elongated plastic deformation member, rotation of the take-up reel is alternatively started and stopped, and the take-up reel has different rotational angles at least before and after rotation is stopped.

In the above storing method for an elongated plastic deformation member in which a thin-plated liner and the elongated plastic deformation member are wound around an outer circumferential surface of a take-up reel and an axis of the take-up reel is set on a mounting surface substantially in parallel thereto, the take-up reel is rotated intermittently during storing of the elongated plastic deformation member, and rotational angles of the take-up reel are different at least before and after rotation is stopped. Therefore, a load of the wound elongated plastic deformation member itself can be imparted uniformly to the entire circumference of the wound elongated plastic deformation member at a time interval without being focused on particular portions thereof. Accordingly, collapsing deformation due to the load of the wound elongated plastic deformation member itself becomes uniform in a longitudinal direction of the wound elongated plastic deformation member. Consequently, difference in the shape of the elongated plastic deformation member does not occur throughout a circumference of the wound elongated plastic deformation member.

In accordance with the above storing method for the elongated plastic deformation member, during storing of the elongated plastic deformation member, rotation of the take-up reel is started and stopped, and the rotational angles of the take-up reel are caused to be different at least before and after rotation is stopped. Accordingly, a load due to the wound elongated plastic deformation member itself is imparted uniformly to the entire circumference of the wound elongated plastic deformation member in accordance with the rotation of the take-up reel. Consequently, an excellent effect can be obtained in that partial deformation or deformation nonuniformity of the elongated plastic deformation member during the storage thereof can be prevented.

Since the elongated plastic deformation member and the liner can be wound around the take-up reel, winding efficiency can be improved, and equipment cost can be reduced.

The invention may also be characterized in that the take-up reel repeats normal rotation and inverse rotation.

By the way, an object to be wound around the liner and stored can be, for example, an elongated plastic deformation member such as a raw rubber product. Since unvulcanized raw rubber exerts a state of plasticity and easily deforms upon receipt of a mechanical stress, if winding of a raw rubber product and rotation of a reel for winding and storing the elongated plastic deformation member are continued in the same direction during storing of the elongated plastic deformation member, tight winding of the wound raw rubber product may occur. Meanwhile, if unwinding of the raw rubber product and rotation of the reel for winding and storing the elongated plastic deformation member are continued in the same direction, loose winding of the wound raw rubber product may occur.

Further, "normal rotation" described herein refers to rotation in a direction in which the elongated plastic deformation member is wound, while "inverse rotation" refers to rotation in a direction in which the elongated plastic deformation member is unwound.

In the above storing method for an elongated plastic deformation member, since the take-up reel repeats normal rotation and inverse rotation, tight winding and loose winding of the elongated plastic deformation member wrapped around the take-up reel can be prevented.

Even when normal rotation and inverse rotation are switched instantly, a moment between the normal rotation and the inverse rotation is regarded as a state in which rotation of the take-up reel is stopped.

In accordance with the above storing method for the elongated plastic deformation member, since the take-up reel repeats normal rotation and inverse rotation, an excellent effect can be obtained in that tight winding and loose winding of the elongated plastic deformation member wound around the take-up reel can be prevented.

The invention may also be characterized in that a rotational angle in a direction in which the take-up reel is unwound is larger than that in a direction in which the take-up reel is wound.

By setting a rotational angle in a direction in which the take-up reel is unwound larger than that in which the take-up reel is wound, tight winding of the elongated plastic deformation member can be prevented.

In accordance with the above storing method for an elongated plastic deformation member, since a rotational angle in a direction in which the take-up reel is unwound is larger than that in a direction in which the take-up reel is wound, an excellent effect can be exhibited in that tight winding of the elongated plastic deformation member can be prevented.

The invention may also be characterized in that a rotational angle of the take-up reel is within a range of 90° to 450° for each time that rotation is performed.

By setting a rotational angle of the take-up reel within a range of 90° to 450° for each time that rotation is performed, a load of the wound elongated plastic deformation member itself can be imparted more uniformly to the entire circumference of the elongated plastic deformation member at a time interval.

The invention may also be characterized in that a difference between rotational angles before and after rotation is stopped is within a range of 5° to 90°.

By setting a difference between rotational angles before and after rotation is stopped within a range of 5° to 90°, a load of the wound elongated plastic deformation member itself can be imparted more uniformly to the entire circumference of the elongated plastic deformation member at a time interval.

The invention may also be characterized in that the difference between rotational angles before and after rotation is stopped is within a range of 20° to 30°.

By setting the difference between rotational angles before and after rotation is stopped within a range of 5° to 90°, a load of the wound elongated plastic deformation member itself can be imparted more uniformly to the entire circumference of the wound elongated plastic deformation member at a time interval.

Another embodiment of the invention is a storing apparatus for an elongated plastic deformation member in which a thin-plated liner and the elongated plastic deformation member are overlapped and wound around an outer circumferential surface of a take-up reel, and the take-up reel is set on a mounting surface such that the axis of the take-up reel and the mounting surface are substantially parallel to each other, comprising rotating means which rotates the take-up reel and in which, during storing of the elongated plastic deformation member, rotation of the take-up reel is alternatively started and stopped, and rotational angles of the take-up reel are caused to be different at least before and after a rotation is stopped.

In the above storing apparatus for an elongated plastic deformation member, a thin-plated liner and the elongated plastic deformation member are overlapped and wound around an outer circumferential surface of a take-up reel. The take-up reel, around which the liner and the elongated plastic deformation member have been wound, is stored in a state in which the axis of the take up reel and the mounting surface are substantially parallel to each other.

During storing of the elongated plastic deformation member which has been wound by the take-up reel, the rotating means alternatively starts and stops the rotation of the take-up reel, and causes rotational angles of the take-up reel to be different at least before and after a rotation is stopped.

For this reason, a load of the wound elongated plastic deformation member itself can be imparted uniformly to the entire circumference of the wound elongated plastic deformation member, without being focused on a particular portion thereof. Collapsing deformation of the elongated plastic deformation member due to its own load becomes uniform in a longitudinal direction thereof, whereby difference in the shape of the elongated plastic deformation member does not occur throughout a circumference of the wound elongated plastic deformation member.

In accordance with the above storing apparatus for an elongated plastic deformation member, during storing of the elongated plastic deformation member which has been wound by the take-up reel, rotation of the take-up reel is alternatively started and stopped, and rotational angles of the take-up reel are caused to be different at least before and after rotation is stopped. Therefore, a load due to the wound elongated plastic deformation member itself is imparted uniformly to the entire circumference of the wound elongated plastic deformation member in accordance with a rotation of the take-up reel. Accordingly, an excellent effect can be obtained in that partial deformation or deformation nonuniformity of the elongated plastic deformation member can be prevented.

The invention may also be characterized in that the rotating means controls detects the rotational angles with an angle detection sensor to perform control.

Rotational angles of the take-up reel are detected by an angle detection sensor and controlled, whereby the take-up reel can be rotated at accurate angles.

The invention may also be characterized in that a rotation time of the take-up reel is controlled by the rotating means.

Since the rotational angles of the take-up reel and the operating time of the rotating means correspond to each other, an operating time of the rotating means can be simply set by using an electric timer.

Further, since there is no need to use expensive parts such as an angle sensor and the like, the apparatus can be manufactured inexpensively.

BRIEF DESCRIPTION OF THE DRAWINGS

FIG. 1 is a side view of a storing apparatus for a take-up reel for winding and storing an elongated plastic deformation member according to a first embodiment of the present invention.

BEST MODE FOR IMPLEMENTING THE INVENTION

[First Embodiment]

Hereinafter, with reference to drawings, a detailed description of a first embodiment of the present invention will be made.

Figure 4:
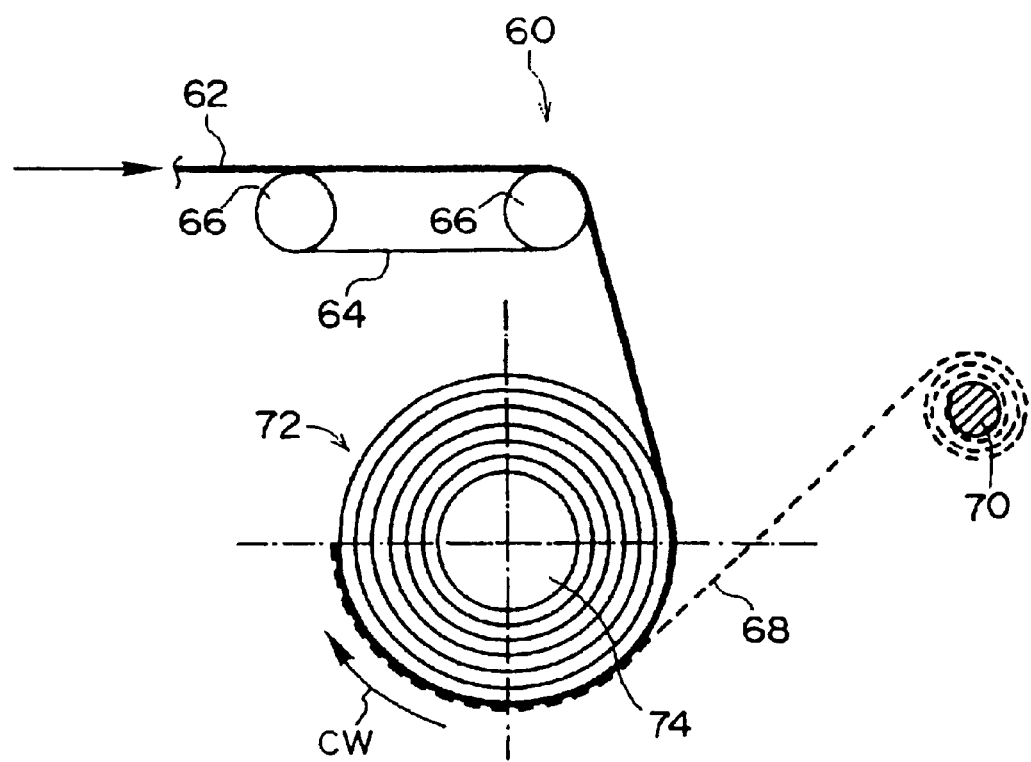
FIG. 4 is a schematic structural view of a tread member winder.

As an example, a tread member winder 60 for winding an unvulcanized tread member for manufacturing a tire is schematically shown in FIG. 4.

The tread member winder 60 comprises a conveying belt 64 for conveying an unvulcanized tread member 62 extruded from an unillustrated extruder, conveying rolls 66 for entraining the conveying belt 64 therearound, a roll 70 for supplying a liner 68 made of a synthetic resin or the like, a rotational shaft 74 for supporting a reel 72 for winding the tread member 62 through the liner 68.

Figure 3:
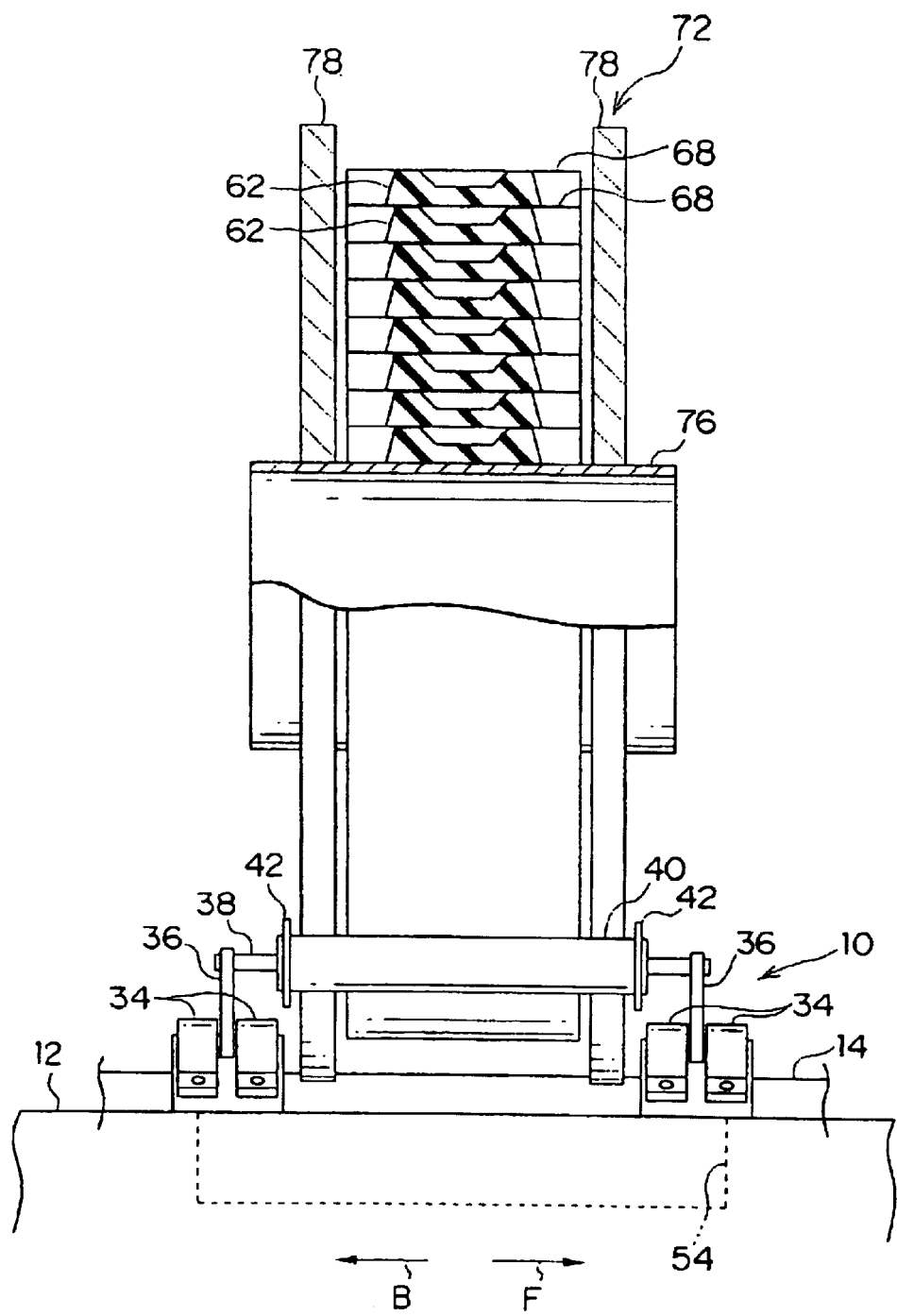
FIG. 3 is a front view of the storing apparatus for the take-up reel for winding and storing the elongated plastic deformation member according to the first embodiment of the present invention.

As shown in FIG. 3, the reel 72 has flanges 78 at both ends of a drum 76 for winding the tread member 62.

The tread member 62 extruded from the extruder is conveyed along the conveying belt 64 and wound around the reel 72.

At this point, since the liner 68 wrapped around the roll 70 is also wound around the reel 72, the tread member 62 is adhered to the liner 68 due to its own adhesiveness, and wound. For this reason, adhesion between the wound tread member 62 and itself does not occur.

As shown in FIG. 3, a cross section of the tread member 62 is often formed into a so-called contour configuration which has a concave portion at the center thereof and both side portions. When the tread member 62 is wound and stored, occurrence of collapse of this contour configuration must be prevented.

Next, a description will be made of a storage device 10 for storing the reel 72 around which the tread member 62 has been wound.

Figure 2:
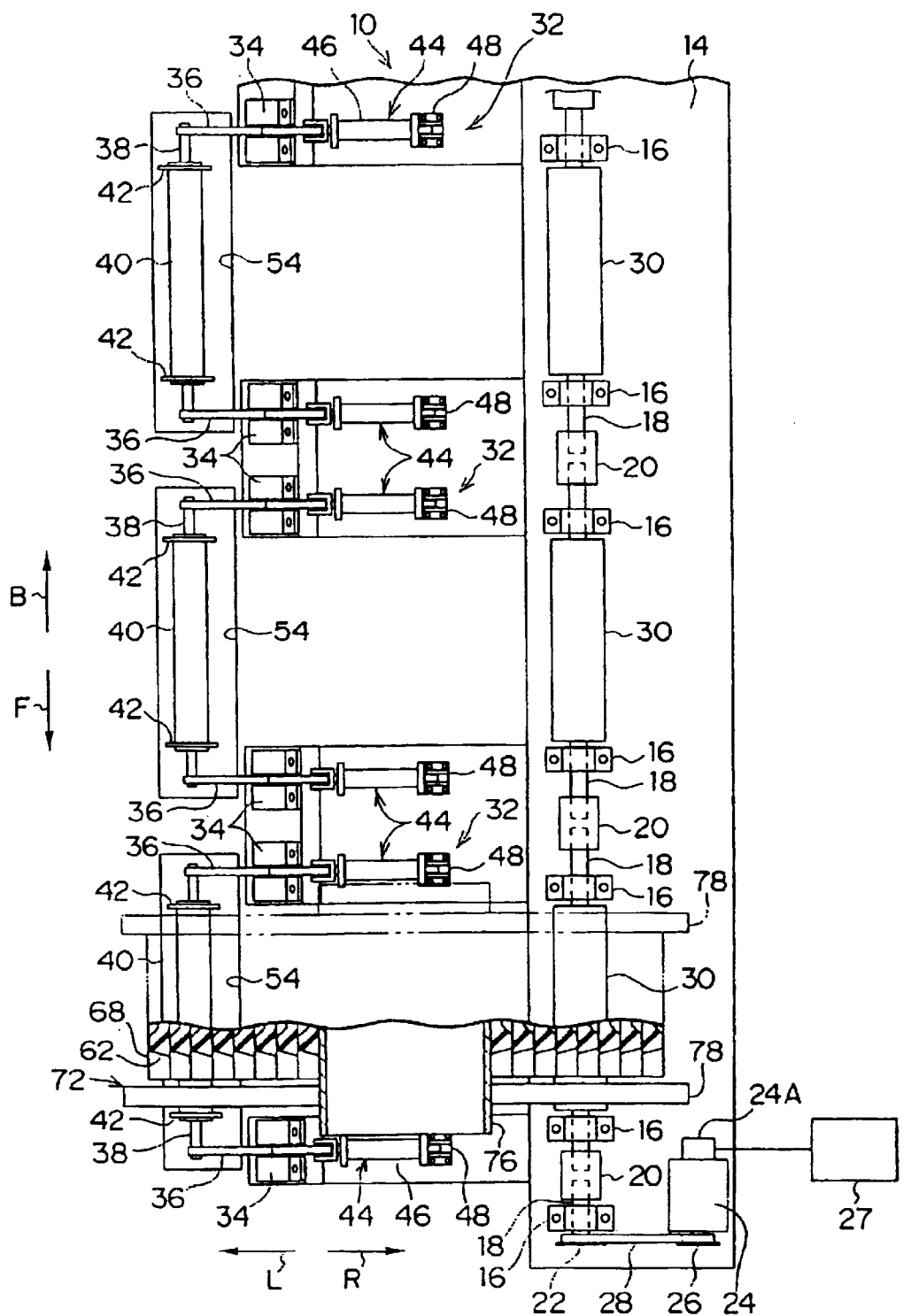
FIG. 2 is a plan view of the storing apparatus for the take-up reel for winding and storing the elongated plastic deformation member according the first embodiment of the present invention.

As shown in FIGS. 1 to 3, the storage device 10 has a frame 14 on a mounting surface (horizontal surface) 12.

The frame 14 has a plurality of bearings 16 mounted in directions of arrow F and arrow B at a side toward a direction of arrow R. Shafts 18 are supported by the bearings 16 so as to be able to rotate freely. Further, the shafts 18 are connected to each other by a coupling 20.

The shaft 18 in the direction of arrow F has a pulley 22 mounted thereto.

The frame 14 has a motor 24 mounted thereto, and a pulley 26 is mounted to a shaft of the motor 24.

A belt 28 is wrapped around the pulley 22 and the pulley 26, and when the motor 24 is driven, the shaft 18 is rotated.

A driving roll 30 is mounted to the shaft 18, and the driving roll 30 is contacted with both outer circumferential surfaces of flanges 78 to rotate the reel 72.

A rotary encoder 24A is mounted to the motor 24 to detect a rotational angle of the shafts. Further, the motor 24 and the rotary encoder 24A are connected to a controller 27.

Here, since each of the flange 78 of the reel 72, the driving roll 30, the pulley 22, and the pulley 26 have a predetermined diameter, a rotational angle of the reel 72 can be detected by the rotary encoder 24A.

A moving roller 32 is provided at a side toward the direction of arrow L of each of the driving rolls 30.

The moving roller 32 has a pair of bearings 34 at a side toward the direction of arrow L of the frame 14. Links 36, each of which is formed into a substantially inverted V shape, are rotatably supported by the bearings 34.

One end portions of the links 36 at a side toward the direction of arrow L thereof are connected to each other by a shaft 38. A driven roll 40 is supported by the shaft 38 so as to be able to rotate freely.

Flanges 42 are attached to both end portions of the driven roll 40 respectively at outside portions of the flanges 78 of the reel 72, and operate to control an axial movement of the reel 72.

Air cylinders 44 are provided at a side toward the direction of arrow R of the bearings 34.

A cylinder body 46 of each of the air cylinders 44 is swingably supported by a bearing 48 provided at the frame 14.

The other end portions of the links 36 at a side toward the direction of arrow R are connected to piston rods 50 of the air cylinder 44 via pins 52.

When the piston rod 50 of the air cylinder 44 is extended, the link 36 rotates in a counter-clockwise direction, and as shown in a two-dot chain line in FIG. 1, the driven roll 40 enters a concave portion 54 formed at the mounting surface 12.

When the piston rod 50 of the air cylinder 44 is withdrawn, as shown by a solid line in FIG. 1, the link 36 rotates in a clockwise direction, and the driven roll 40 moves a predetermined distance with respect to the mounting surface 12.

Here, the reel 72 is put on the driving roll 30 and the driven roll 40 in a state in which the driven roll 40 is positioned a predetermined distance from the mounting surface 12, the bottom end portion of the reel 72 is positioned further in an upward direction than the mounting surface 12, whereby the reel 72 is supported by the driving roll 30 and the driven roll 40.

Further, in a state in which the driven roll 40 is entered into the concave portion 54, the bottom end portion of the reel 72 is kept in contact with the mounting surface 12. Accordingly, the reel 72 can be rotated on the mounting surface 12.

(Operation)

Operation of the storing apparatus 10 of the present embodiment will be explained next.

First, the tread member 62 extruded from an unillustrated extruder is conveyed by the conveying belt 64, and, together with the liner 68, wound on the reel 72. When winding of a predetermined length of the tread member 62 has been completed, the reel 72 is removed from the rotational axis 74, rotated on the mounting surface 12, and carried to the storing apparatus 10.

In the storing apparatus. 10, first, as shown by a two-dot chain line in FIG. 1, in a state in which the driven roll 40 is entered into the concave portion 54, the reel 72 is rotated from a side toward the direction of arrow L to a side toward the direction of arrow R, and abutted to the driving roll 30.

Next, the piston rod 50 of the air cylinder 44 is withdrawn, and the link 36 is rotated in a clockwise direction. Accordingly, the driven roll 40 moves upwardly, and lifts the reel 72. The reel 72 is separated from the mounting surface 12, and supported by the driving roll 30 and the driven roll 40.

In the storing apparatus 10, rotation of the reel 72 around which the tread member 62 and the liner 68 have been wound is alternatively started and stopped, and rotational angles of the reel 72 are caused to be different at least before and after rotation is stopped.

A rotational angle of the reel 72 is preferably within a range of 90° to 450° for each time that rotation is performed, and a difference between rotational angles before and after rotation of the reel 72 is stopped is preferably within a range of 5° to 90°, and a rotational angle difference before and after a rotation of the reel 72 is stopped is more preferably within a range of 20° to 30°.

In the present embodiment, an operation is carried out such that the motor 24 is driven to rotate the reel 72, for example, 160° at a low speed in a clockwise direction (direction of arrow CW: a direction in which the tread member 62 is wound). After the reel 72 has been rotated 160°, the reel 72 is then inversely rotated 180° in a counter-clockwise direction (direction in which the tread member 62 is unwound). After the reel 72 has been rotated at 180°, the reel 72 is inversely rotated. Thereafter, the inverse operation is repeated until the tread member 62 is used up.

Here, time during which rotation is stopped varies in accordance with weight or hardness of the tread member 62. However, it is a matter of course that it is the time during which deformation of the tread member 62 in a stopped state is prevented.

A rotational angle of the reel 72 is detected by a rotary encoder 24A. The rotational angle of the reel 72 is accurate because the controller 27 controls rotation of the motor 24 on the basis of rotational angle information for the reel 72 that has been previously stored.

During storing, due to rotation of the reel 72, a load due to a weight of the wound tread member 62 itself is imparted uniformly to the entire circumference of the wound tread member 62. Therefore, collapsing deformation of the tread member 62 due to the load becomes uniform in a longitudinal direction of the tread member 62. Accordingly, difference in the shape of the tread member 62 does not occur throughout a circumference of the wound tread member 62.

Since a longitudinal gauge of one tread to be molded as a tire is uniform, it does not affect uniformity.

As described above, since the reel 72 repeats normal rotation (rotation in the direction of arrow CW) and inverse rotation, tight winding and loose winding of the tread member 62 can be suppressed.

Further, since the rotational angle of the tread member 62 in a direction in which the tread member 62 is unwound (180°) is made larger than the rotational angle of the tread member 62 in a direction in which the tread member 62 is wound (160°), tight winding can be reliably prevented.

In a case of an automobile tire, for example, a range of thickness of a thickest portion for each of treads of various sizes is approximately 8 to 15 mm. In a conventional method, usually, a winding interval is set at 15 mm or more in order to form a spacing d between a liner and a tread. However, if the method of the present embodiment is adopted, since a winding interval is the same as that in a method for general use, the reel 72 can wind the tread member 62 even longer that in a conventional method such that a thinner tread member having a thickness of about 8 mm can be wound at a winding ratio of just over 1.8 times, and a tread member having an average thickness of about 10 mm can be wound at a winding ratio of just under 1.5 times, in comparison with a conventional method.

For this reason, the number of the reels 72 and the liners 68 can be reduced to about ⅔ of those in a conventional example.

In the present embodiment, the motor 24 is controlled on the basis of rotational angle information previously stored in the controller 27 and a detection result of a rotational angle detected by the rotary encoder 24A. However, the motor 24 can be controlled without using the rotary encoder 24A.

For example, since a rotational frequency (rpm) is already known, the reel 72 can be rotated by a predetermined angle due to control of driving time of the motor 24. In this case, for example, the driving time for normal rotation and that for inverse rotation can be stored previously in the controller 27.

In a case of this method, since the rotary encoder 24A is not used, the number of parts for the apparatus and a manufacturing cost can be reduced.

When the rotary encoder 24A is not used, control accuracy of a rotational angle is slightly deteriorated. However, this does not have any adverse affect on practical use of the storing apparatus 10.

[Second Embodiment]

A second embodiment of the present invention will be explained with reference to FIGS. 5 and 6. Portions identical to those in the above-described embodiment are denoted by the same reference numerals, and description thereof will be omitted.

Figure 5A:
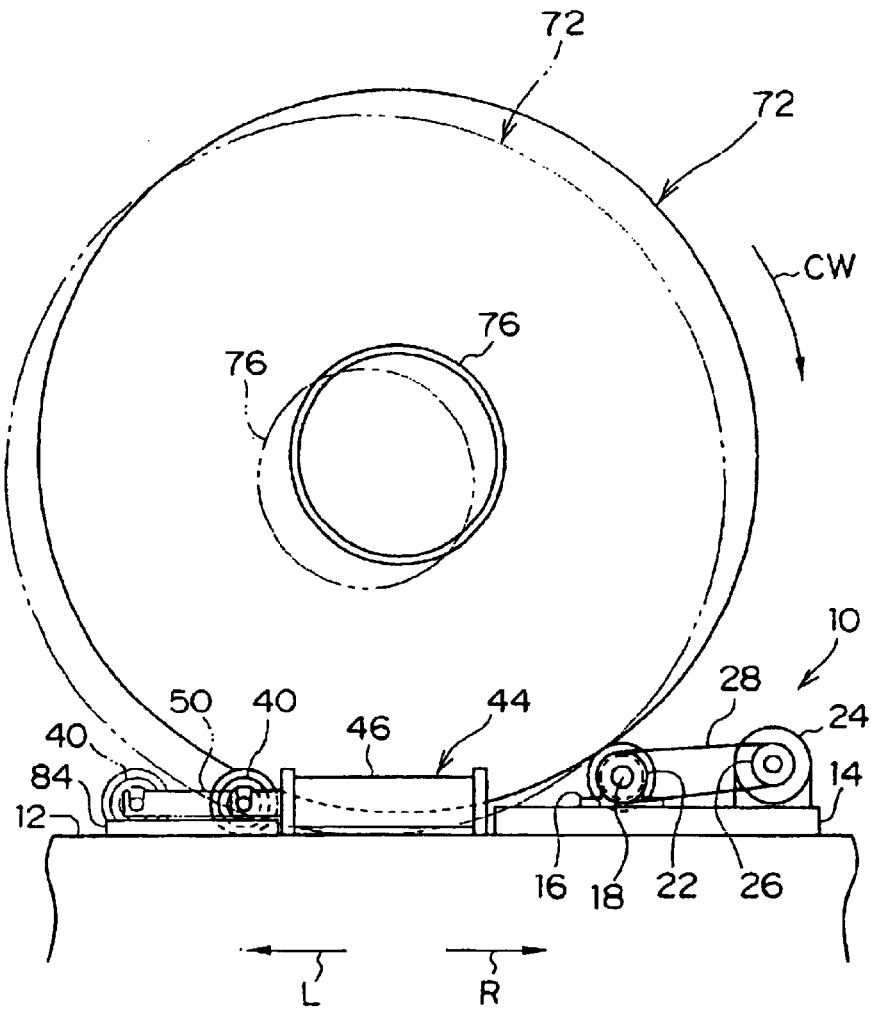
FIG. 5A is a side view of a storing apparatus for a take-up reel for winding and storing an elongated plastic deformation member according to a second embodiment of the present invention.
Figure 5B:
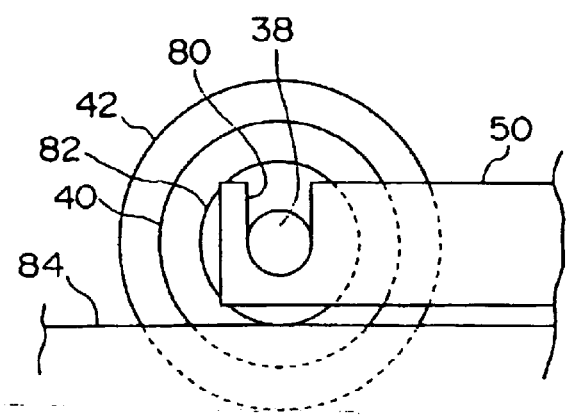
FIG. 5B is a side view in the vicinity of driven rollers.
Figure 6:
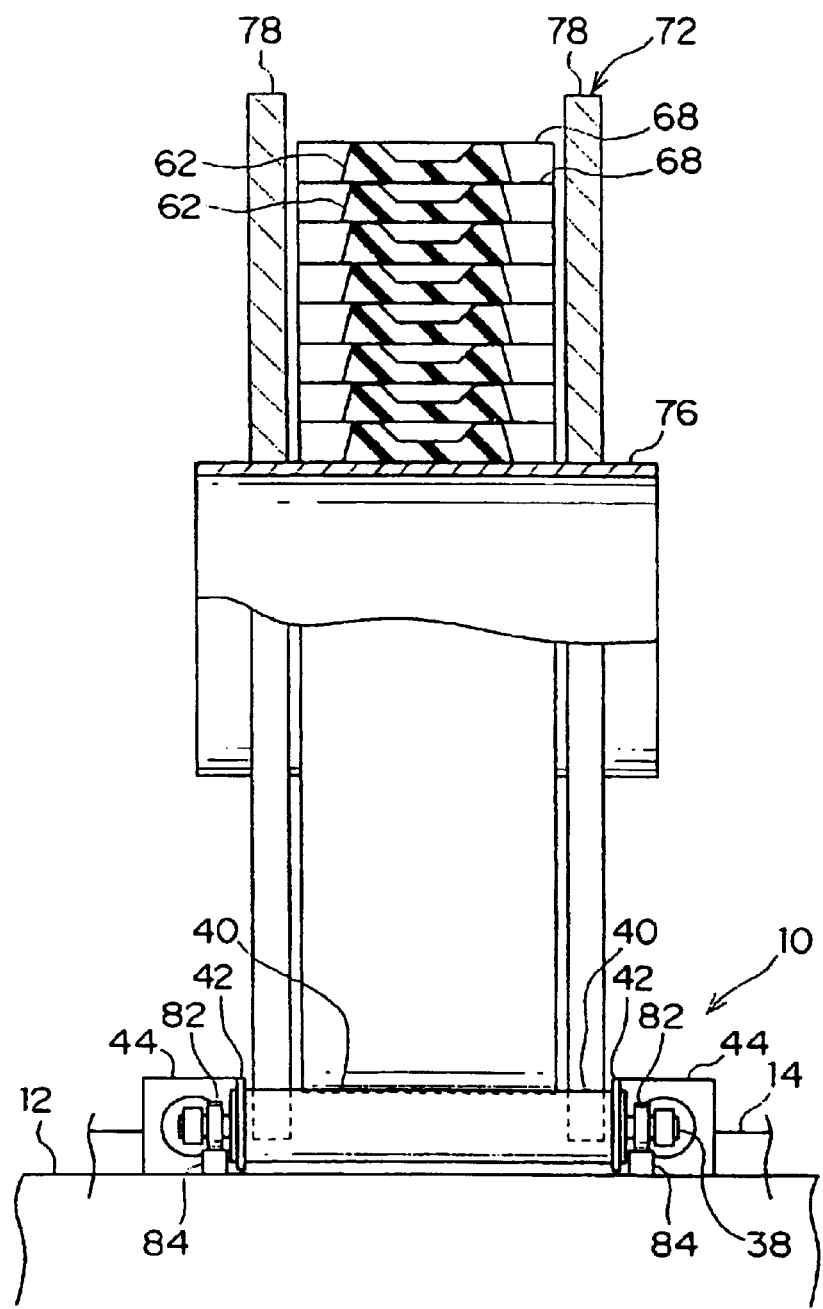
FIG. 6 is a front view of the storing apparatus for the take-up reel for winding and storing the elongated plastic deformation member according to the second embodiment of the present invention.

As shown in FIGS. 5 and 6, in the present embodiment, the air cylinders 44 are disposed horizontally on the mounting surface 12.

A substantially U-shaped notch 80 is formed at the tip end of the piston rod 50. The shaft 38 having the driven roll 40 can be inserted into the notch 80. One end portion of the shaft 38 is inserted into the notch 80 of the piston rod 50 of one of the air cylinders 44, and the other end portion of the shaft 38 is inserted into the notch 80 of the piston rod 50 of the other.

Small rolls 82 are supported at both sides of the driven roll 40 so as to be able to rotate freely. The small rolls 82 are disposed on a rail 84 which is provided on the mounting surface 12, and support a load of the reel 72 acting on the driven roll 40.

Next, operation of the storing apparatus 10 according to the present embodiment will be explained.

In the present embodiment, first, as shown by a two-dot chain line in FIG. 5A, in a state in which the piston rod 50 of the air cylinder 44 is extended, the driven roll 40 is removed from the piston rod 50, and the reel 72 is rotated and abutted to the driving roll 30.

Then, the driven roll 40 is mounted to the piston rod 50, and the piston rod 50 of the air cylinder 44 is withdrawn.

Accordingly, the driven roll 40 is abutted to the flange 78, and as shown by a solid line in FIG. 5A, the reel 72 is lifted and separated from the mounting surface 12, and supported by the driving roll 30 and the driven roll 40.

Thereafter, in the same manner as in the first embodiment of the present invention, the reel 72 is rotated and stored.

The present embodiment exhibits the same effects as the first embodiment of the present invention.

[Third Embodiment]

A third embodiment of the present invention will be explained with reference to FIGS. 7 and 8. In the storing apparatus 10 of the present invention, portions identical to those in above-described embodiments are denoted by the same reference numerals, and a description thereof will be omitted.

Figure 7:
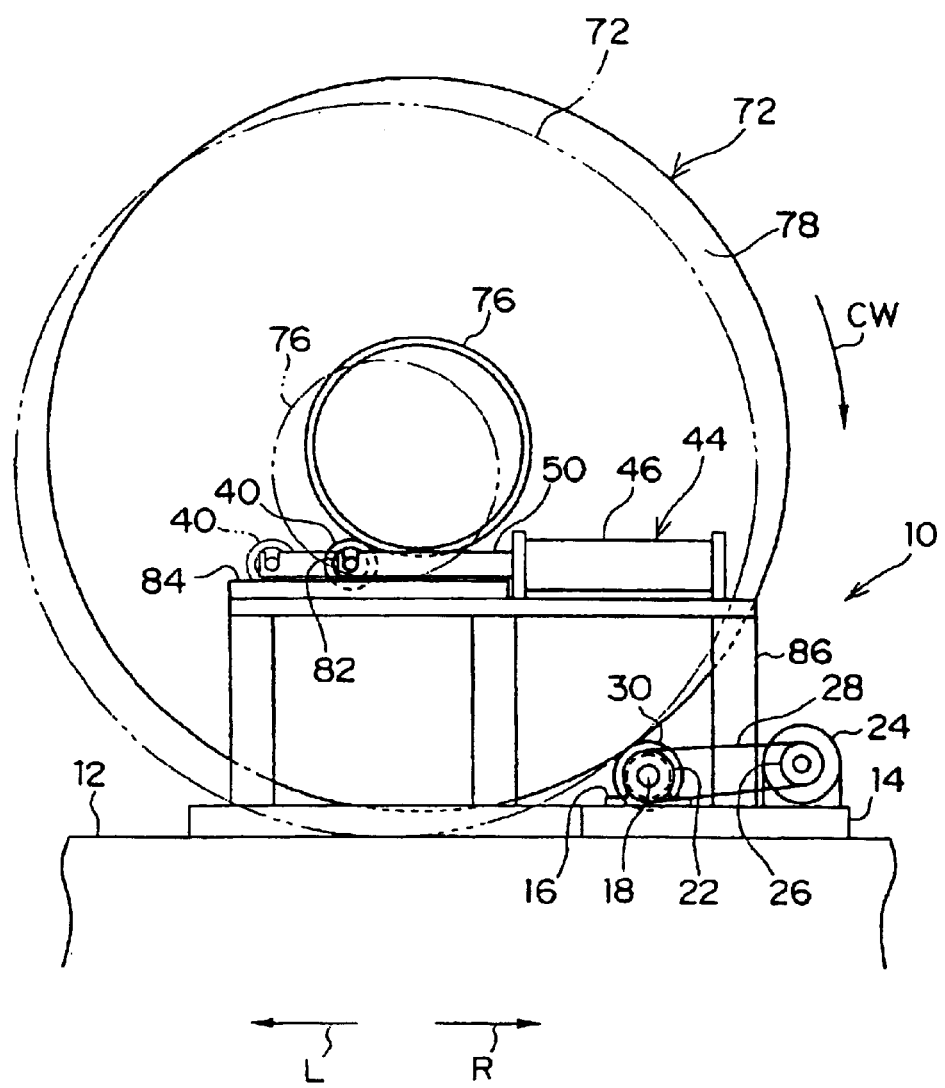
FIG. 7 is a side view of a storing apparatus for a take-up reel for winding and storing an elongated plastic deformation member according to a third embodiment of the present invention.
Figure 8:
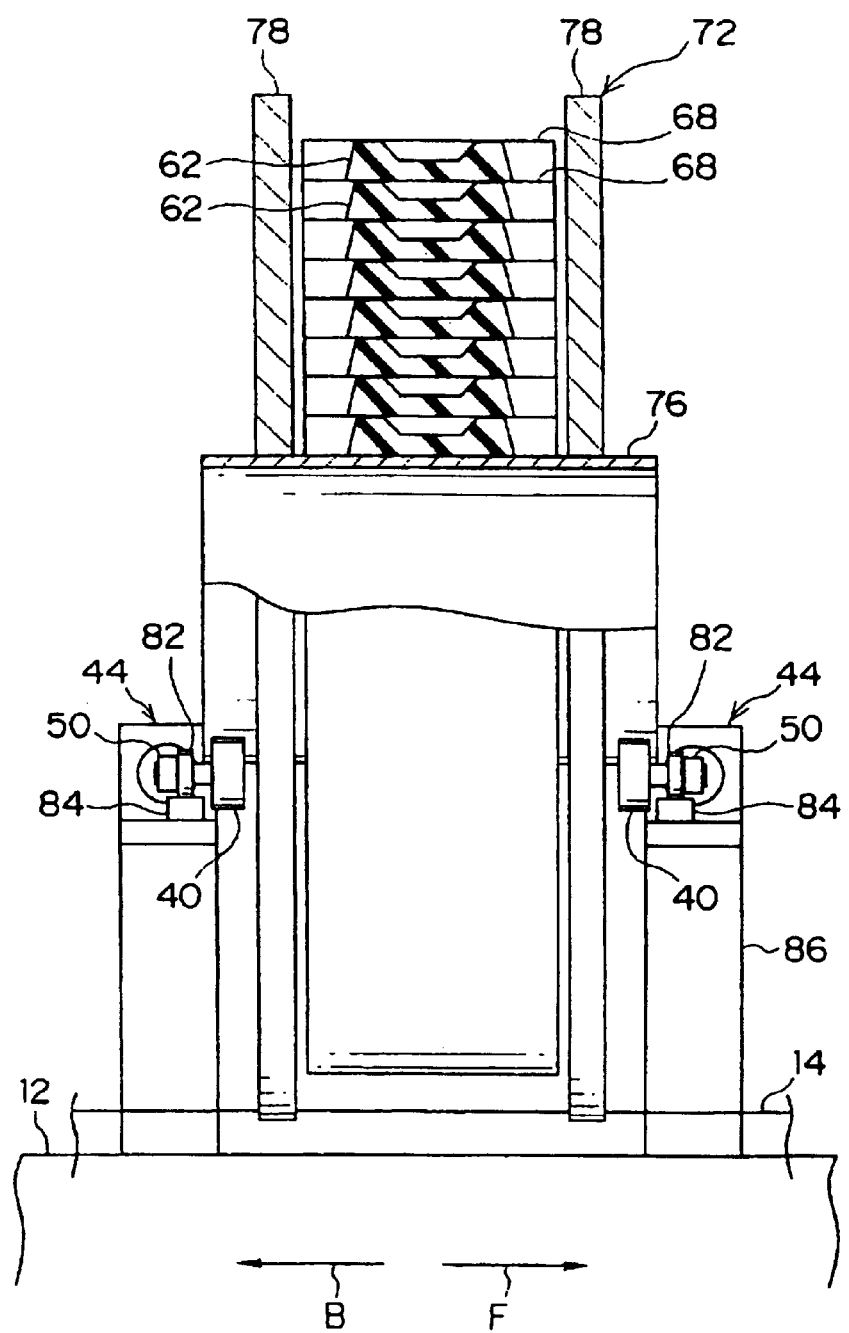
FIG. 8 is a front view of the storing apparatus for the take-up reel for winding and storing the elongated plastic deformation member according to the third embodiment of the present invention.

As shown in FIGS. 7 and 8, in the present embodiment, the air cylinders 44 and the rail 84 having the same structure as those in the second embodiment of the present invention are disposed horizontally at an upper portion of a support 86.

Next, operation of the storing apparatus 10 of the present embodiment will be explained.

In the present embodiment, first, as shown by a two-dot chain line in FIG. 7, in a state in which the piston rod 50 of the air cylinder 44 is extended, the driven roll 40 is removed from the piston rod 50, and the reel 72 is rotated and abutted to the driving roll 30.

Next, the driven roll 40 is mounted to the piston rod 50, and the piston rod 50 of the air cylinder 44 is withdrawn.

As a result, the driven roll 40 is abutted to the drum 76, and as shown by a solid line in FIG. 7, the reel 72 is lifted, separated from the mounting surface 12, and supported by the driving roll 30 and the driven roll 40.

Thereafter, in the same manner as in the above-described embodiments of the present invention, the reel 72 is rotated and stored.

The present embodiment exhibits the same effects as those of the above-described embodiments of the present invention.

[Fourth Embodiment]

A fourth embodiment of the present invention will be explained with reference to FIGS. 9 and 10. Further, portions identical to those shown in the above-described embodiments are denoted by the same reference numerals, and description thereof will be omitted.

Figure 9:
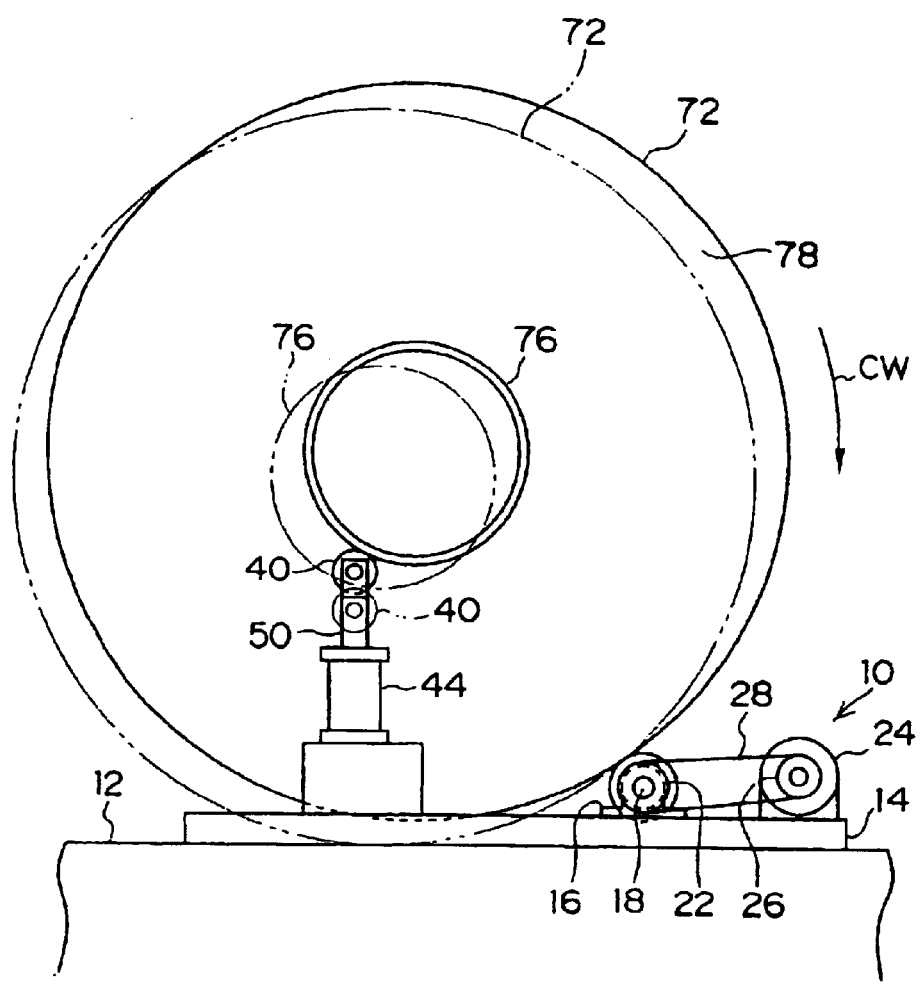
FIG. 9 is a side view of a storing apparatus for a take-up reel for winding and storing an elongated plastic deformation member according to a fourth embodiment of the present invention.
Figure 10:
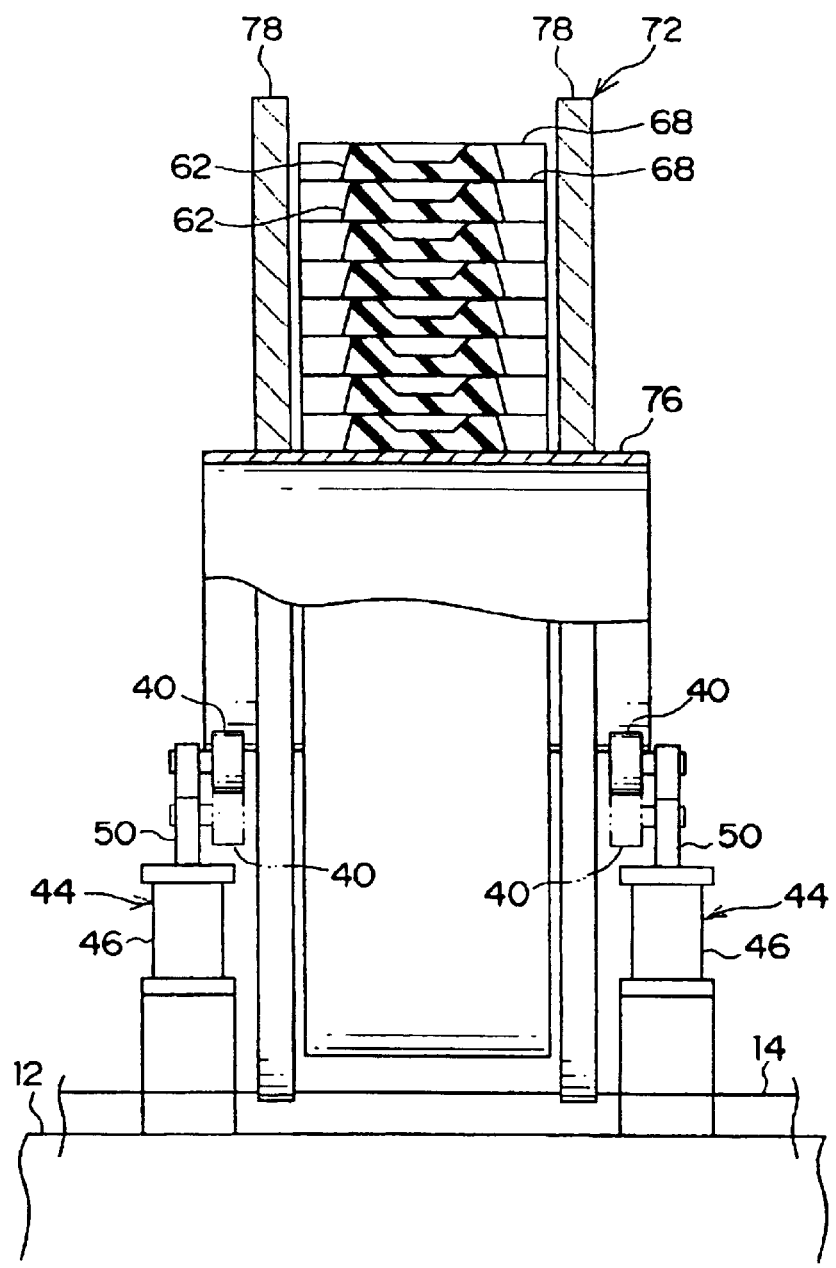
FIG. 10 is a front view of the storing apparatus for the take-up reel for winding and storing the elongated plastic deformation member according to the fourth embodiment of the present invention.

As shown in FIGS. 9 and 10, in the present embodiment, the air cylinder 44 is disposed vertically on the mounting surface 12.

Further, in the present embodiment, the shaft 38 having the driven rolls 40 is fixed to the piston rod 50 of the air cylinder 44.

Next, operation of the storing apparatus 10 of the present embodiment will be explained.

First, in the present embodiment, as shown by a two-dot chain line in FIG. 9, in a state in which the piston rod 50 of the air cylinder 44 is withdrawn, the reel 72 is rotated and abutted to the driving roll 30.

Then, the piston rod 50 of the air cylinder 44 is made to protrude.

Accordingly, the driven roll 40 is abutted to the drum 76, and as shown by a solid line in FIG. 9, the reel 72 is lifted, separated from the mounting surface 12, and supported by the driving roll 30 and the driven rolls 40.

Thereafter, in the same manner as in the above-described embodiments, the reel 72 is rotated and stored.

The present embodiment exhibits the same effects as those of the above-described embodiments of the present invention.

[Fifth Embodiment]

A fifth embodiment of the present invention will be explained with reference to FIGS. 11 and 12. Further, portions identical to those shown in the above-described embodiments are denoted by the same reference numerals, and description thereof will be omitted.

Figure 11:
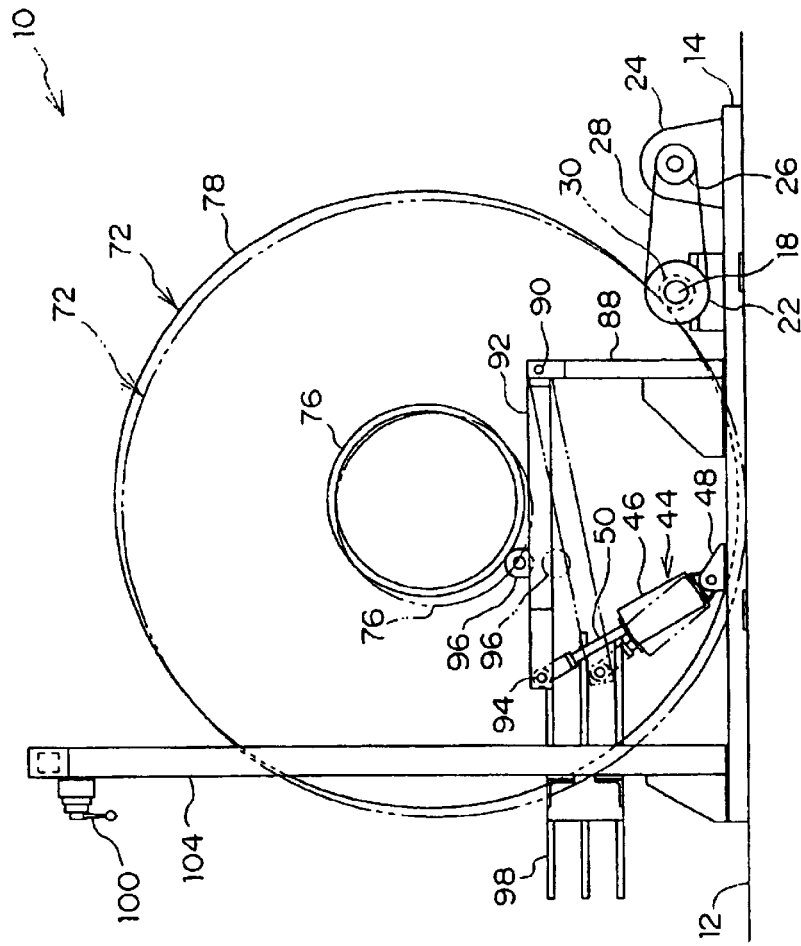
FIG. 11 is a side view of a storing apparatus for a take-up reel for winding and storing an elongated plastic deformation member according to a fifth embodiment of the present invention.
Figure 12:
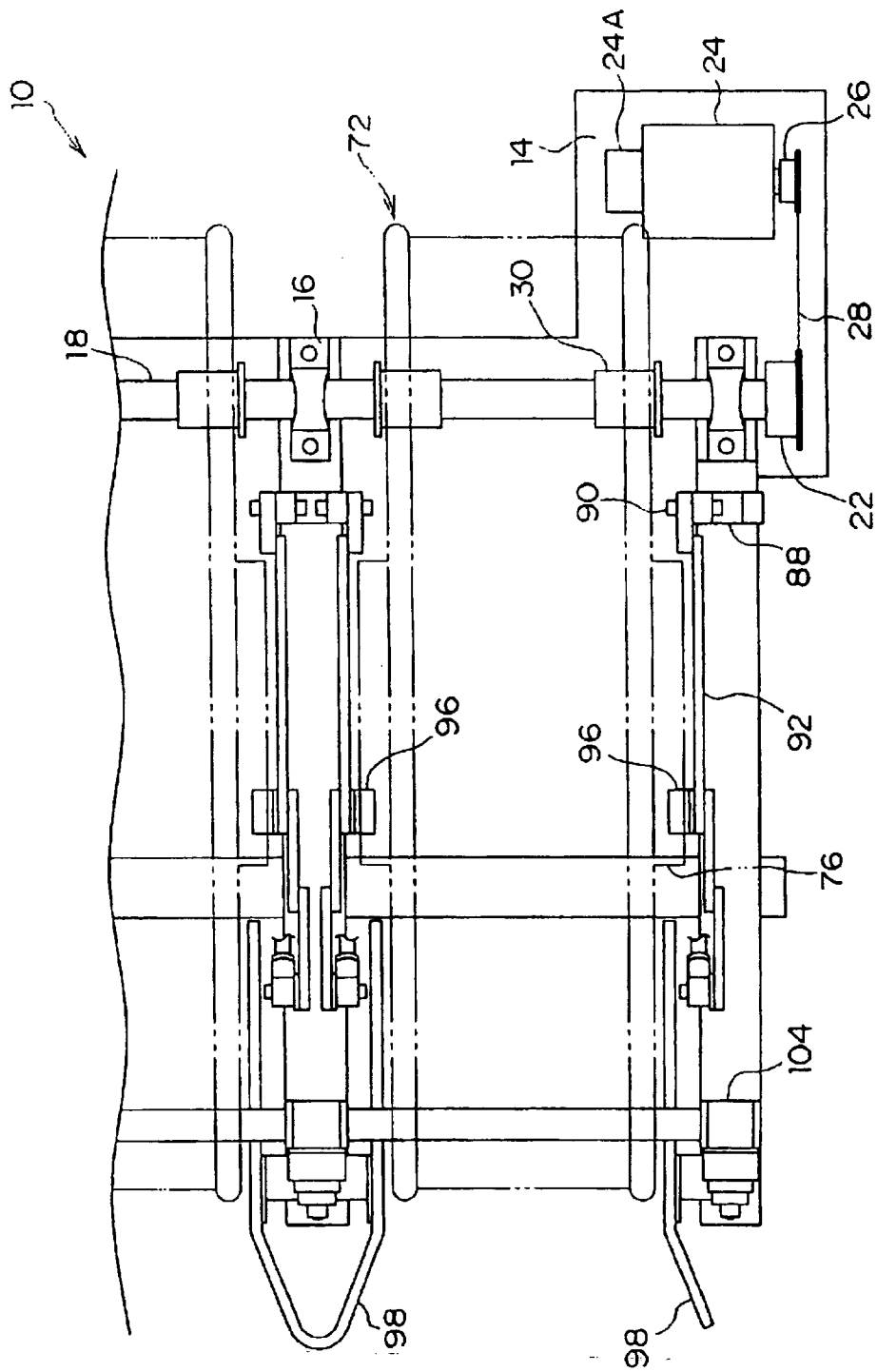
FIG. 12 is a front view of the storing apparatus for the take-up reel for winding and storing the elongated plastic deformation member according to the fifth embodiment of the present invention.

As shown in FIGS. 11 and 12, a support 88 is disposed in the vicinity of the bearing 16 and stands upright from the frame 12.

An arm 92 is swingably mounted to an upper portion of the support 88 via a pin 90.

The piston rod 50 of the air cylinder 44 is connected to an end portion of the arm 92 at the opposite side from the pin 90, via a pin 94.

Supporting rollers 96 are provided at an intermediate portion of the arm 92, and support the drum 76 of the reel 72.

An insert guide 98 of the reel 72 and a support 104 to which an operation lever 100 of the air cylinder 44 is attached are provided at the frame 14.

Next, operation of the storing apparatus 10 of the present embodiment will be explained.

In the present embodiment, first, as shown by a two-dot chain line in FIG. 11, the piston rod 50 of the air cylinder 44 is withdrawn, the arm 92 is lowered, and the supporting roller 96 is positioned further in a downward direction than the bottom end portion of the drum 76 of the reel 72.

Then, the reel 72 is rotated and abutted to the driving roll 30.

Next, the piston rod 50 of the air cylinder 44 is protruded, and the arm 92 is lifted.

Accordingly, the supporting roller 96 is abutted to the drum 76, and as shown by a solid line of FIG. 11, the reel 72 is lifted, separated from the mounting surface 12, and then supported by the driving roll 30 and the supporting roller 96.

Thereafter, in the same manner as in the above-described embodiments, the reel 72 is rotated and stored.

The present embodiment exhibits the same effects as those of the above-described embodiments.

[Sixth Embodiment]

A sixth embodiment of the present invention will be explained with reference to FIGS. 13 and 14. Further, portions identical to those shown in the above-described embodiments are denoted by the same reference numerals, and description thereof will be omitted.

Figure 13:
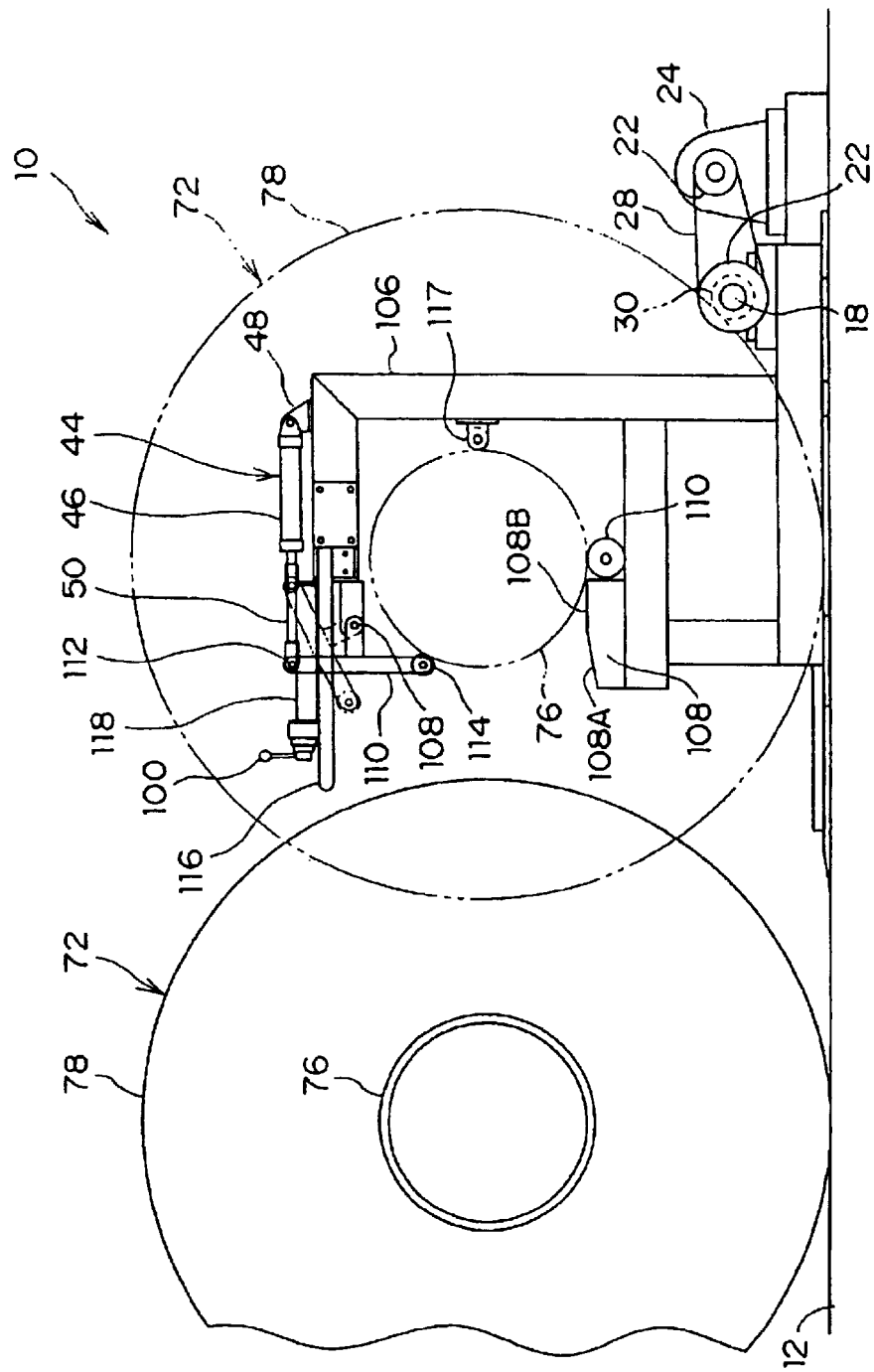
FIG. 13 is a side view of a storing apparatus for a take-up reel for winding and storing an elongated plastic deformation member according to a sixth embodiment of the present invention.
Figure 14:
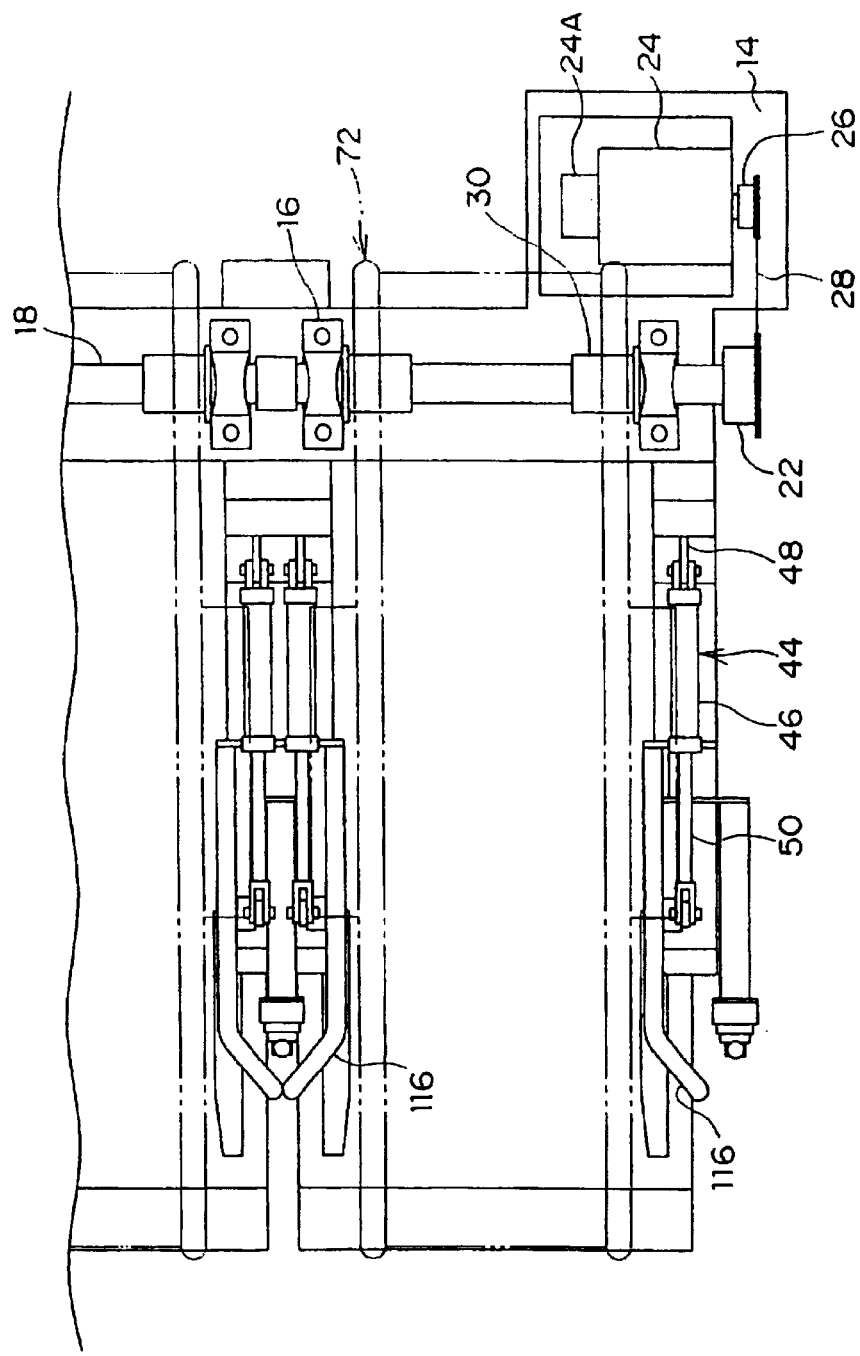
FIG. 14 is a front view of the storing apparatus for the take-up reel for winding and storing the elongated plastic deformation member according to the sixth embodiment of the present invention.
Figure 15:
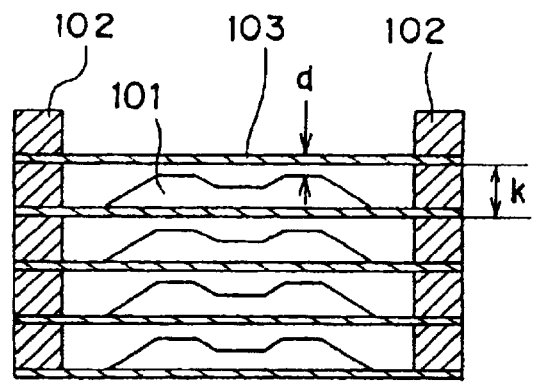
FIG. 15 is a schematic structural view of a conventional storing apparatus for an elongated member.
Figure 16:
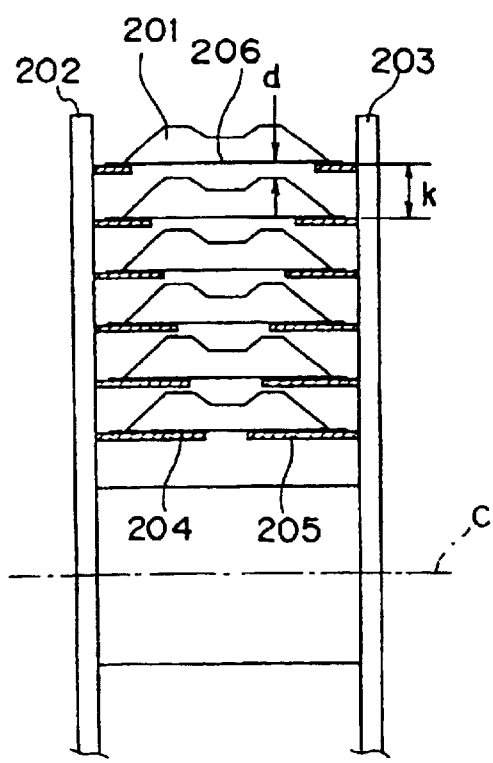
FIG. 16 is a schematic structural view of another conventional storing apparatus for an elongated member.

As shown in FIGS. 13 and 14, a support 106 stands upright from the frame 14.

A T-shaped arm 110 is swingably mounted at an upper portion of the support 106 via a pin 108.

The piston rod 50 of the air cylinder 44 is connected to one end portion of the T-shaped arm 110 via a pin 112.

A supporting roller 114 is provided at the other end portion of the T-shaped arm 110 to support the drum 76 of the reel 72 A tapered guide 115 and a supporting roller 119 are provided at an intermediate point of the support 106 to support the drum 76 of the reel 72.

The tapered guide 115 comprises a sloped surface 115A and a level surface 115B. When the drum 76 rides on the level surface 115B, the flange 78 is separated from the mounting surface 12.

A supporting roller 117 is disposed at a side surface of the support 106 to support the drum 76 of the reel 72.

An insert guide 116 of the reel 72 and an arm 118 to which an operation lever 100 of the air cylinder 44 is attached are provided at an upper portion of the support 106.

Operation of the storing apparatus 10 of the present embodiment will be explained next.

In the present embodiment, first, as shown by a two-dot chain line in FIG. 13, the piston rod 50 of the air cylinder 44 is withdrawn, the supporting roller 114 of the T-shaped arm 110 is lifted, and the supporting roller 114 is positioned further in an upward direction than an upper end portion of the drum 76 of the reel 72.

Next, the reel 72 is rotated, and the drum 76 is made to ride on the tapered guide 115. The reel 72 is further rotated, and the drum 76 is put on the supporting roller 119. Accordingly, the reel 72 is separated from the mounting surface 12.

The piston rod 50 of the air cylinder 44 is made to protrude, the T-shaped arm 110 is rotated, and the supporting roller 114 is abutted to the flange 78.

Accordingly, in a state in which the reel 72 is separated from the mounting surface 12, the reel 72 is supported by the supporting roller 119, the supporting roller 114, the supporting roller 117, and the driving roll 30.

Thereafter, in the same manner as in the above-described embodiments, the reel 72 is rotated and stored.

The present embodiment has the same effects as those of the above-described embodiments.

Further, in the above-described embodiments, descriptions have been made by using a tread member for a tire as an example of the elongated plastic deformation member. However, it is a matter of course that the present invention can be applied to side rubber, an inner liner, a chamfer or the like as long as it is an elongated plastically deformable rubber product or intermediate member.

Industrial Availability

As described above, the storing method and storing apparatus for an elongated plastic deformation member according to the present invention are suitable for storing an elongated plastically deformable rubber product or intermediate member such as side rubber, an inner liner, a chamfer or the like.

What is claimed is:

1. A storing method for an elongated plastic deformation member in which a thin-plated liner and the elongated plastic deformation member are overlapped and wound around an outer circumferential surface of a take-up reel, and the take-up reel is set on a mounting surface such that the axis of the take-up reel and the mounting surface are substantially parallel to each other, characterized in that during storing of the elongated plastic deformation member, rotation of the take-up reel is alternatively started and stopped, and the take-up reel has different rotational angles at least before and after rotation is stopped.

2. The storing method for an elongated plastic deformation member according to claim 1, characterized in that the take-up reel repeats normal rotation and inverse rotation.

3. The storing method for an elongated plastic deformation member according to claim 2, characterized in that a rotational angle in a direction in which the take-up reel is unwound is larger than that in a direction in which the take-up reel is wound.

4. The storing method for an elongated plastic deformation member according to claim 1, characterized in that a rotational angle of the take-up reel is within a range of 90° to 450° for each time rotation is performed.

5. The storing method for an elongated plastic deformation member according to claim 1, characterized in that a difference between rotational angles before and after rotation is stopped is within a range of 5° to 90°.

6. The storing method for an elongated plastic deformation member according to claim 5, characterized in that the difference between rotational angles before and after rotation is stopped is within a range of 20° to 30°.

7. A storing apparatus for an elongated plastic deformation member in which a thin-plated liner and the elongated plastic deformation member are overlapped and wound around an outer circumferential surface of a take-up reel, and the take-up reel is set on a mounting surface such that the axis of the take-up reel and the mounting surface are substantially parallel to each other, comprising:

rotating means which rotates the take-up reel and in which, during storing of the elongated plastic deformation member, rotation of the take-up reel is alternatively started and stopped, and rotational angles of the take-up reel are caused to be different at least before and after rotation is stopped.

8. The storing apparatus for an elongated plastic deformation member according to claim 7, characterized in that the rotating means detects the rotational angles of the take-up reel with an angle detection sensor to perform control.

9. The storing apparatus for an elongated plastic deformation member according to claim 7, characterized in that the rotating means controls a rotation time of the take-up reel.

* * * * *